United States Patent [19]
Walter et al.

[11] Patent Number: 5,854,297
[45] Date of Patent: Dec. 29, 1998

[54] FOAM MATERIALS BASED ON COPOLYMERS OF STYRENE AND 1,1-DIPHENYLETHENE

[75] Inventors: Manfred Walter, Speyer; Konrad Knoll, Ludwigshafen; Michael Schneider, Neustadt; Karl-Heinz Wassmer, Mutterstadt, all of Germany

[73] Assignee: BASF Aktiengesellschaft, Ludwigshafen, Germany

[21] Appl. No.: 755,256

[22] Filed: Nov. 22, 1996

[30] Foreign Application Priority Data

Nov. 29, 1995 [DE] Germany .......... 195 44 487.6

[51] Int. Cl.⁶ .......... C08F 14/00; C08J 9/20
[52] U.S. Cl. .......... 521/146; 521/56; 521/60; 521/64
[58] Field of Search .......... 521/146, 56, 64, 521/60

[56] References Cited

U.S. PATENT DOCUMENTS

| | | | |
|---|---|---|---|
| 5,290,819 | 3/1994 | Witt et al. .......... | 521/146 |
| 5,512,604 | 4/1996 | Demopolis .......... | 521/146 |
| 5,525,639 | 6/1996 | Keneko et al. .......... | 521/146 |

FOREIGN PATENT DOCUMENTS

WO 95/34586  12/1995  WIPO .

OTHER PUBLICATIONS

E. Ureta et al, "Anionic Copolymerization of Styrene and 1,1–Diphenylethylene", Journal of Polymer Science: Part A–1, vol. 4, 1966, pp. 2219–2227.

H. Yuki et al, "Anionic Copolymerization of Styrene and 1,1–Diphenylethylene", Bulletin of the Chemical Society of Japan, vol. 40, 1967, pp. 2659–2663.

Database WPI, Section Ch, Week 9120, Derwent Publications Ltd., Class A13, AN 91–143958, JP,A,03079613, Apr. 4, 1991.

W.J. Trepka, "Synthesis and Properties of Block Polymers of 1,1–Diphenylethylene/Styrene and Butadiene", Journal of Polymer Science, Polymer Letters Edition, vol. 8, 1970, pp. 499–503.

*Primary Examiner*—John M. Cooney, Jr.
*Attorney, Agent, or Firm*—Oblon, Spivak, McClelland, Maier & Neustadt, P.C.

[57] ABSTRACT

Foam materials based on copolymers of styrene with from 2 to 50 mol % of 1,1-diphenylethene have a high heat distortion resistance.

8 Claims, No Drawings

FOAM MATERIALS BASED ON COPOLYMERS OF STYRENE AND 1,1-DIPHENYLETHENE

The invention relates to foam materials of styrene polymers having increased heat distortion resistance.

Foam materials based on styrene polymers having high heat distortion resistance are known, for example on the basis of copolymers of styrene with maleic acid or N-substituted maleimide or of mixtures of polystyrene with polyphenylene ether or polyphenylene sulfide. However, these foams have various disadvantages.

It is an object of the present invention to provide further foam materials based on styrene polymers having increased heat distortion resistance.

We have found that this object is achieved by foam materials based on copolymers of styrene and from 2 to 50 mol % of 1,1-diphenylethene.

The invention starts out from copolymers of styrene with from 2 to 50 mol %, preferably from 5 to 45 mol % and in particular from 10 to 40 mol %, of 1,1-diphenylethene. The copolymer can also contain up to 20 mol % of other comonomers, for example α-methylstyrene, ring-alkylated styrenes, acrylonitrile or maleic anhydride, in copolymerized form.

Copolymers of styrene and 1,1-diphenylethene are prepared by anionic copolymerization using, for example, butyllithium in suitable solvents. The comonomer ratio can be set to any value from 2 to 50 mol % of diphenylethene. Block copolymers can also be prepared. The copolymerization is described, for example, by E. Ureta, I. Smid, M. Szwarc, J. Polym. Sci., Part A: Polymer Chem. 1966, 4, 2219 or H. Yuki, I. Hotta, Y. Okamoto, S. Murahashi, Bull. Chem. Soc. Japan 1967, 40, 2659, and also in WO 95/34568.

The foam materials of the present invention can be in various forms: as beads having a diameter of from 0.2 to 10 mm; as moldings comprising beads welded together; as boards having a thickness of from 15 to 200 mm and as sheets having a thickness of from 1 to 12 mm. The density can vary within relatively wide limits from 8 to 100 g·l$^{-1}$; it is preferably from 10 to 80 g·l$^{1.}$ The minigranules are produced by the customary method. The copolymer is melted in an extruder and the additives are mixed in. Various methods of chopping can be used: hot or cold chopping, underwater granulation and ring channel chopping. Possible additives are: antioxidants, light stabilizers, dyes, cell nucleating agents, flame retardants such as hexabromocyclododecane or other aliphatic bromine compounds and synergists for the flame retardant, for example peroxides or dicumyl, tin compounds as stabilizers for the flame retardant, antistatic agents, etc. The flame retardants are added in amounts of from 0.5 to 10% by weight, the synergists in amounts of from 0.1 to 1.0% by weight, based on the copolymer.

In the preferred process for producing the foam beads, the minigranules are added to the aqueous phase, preferably in a phase ratio of from 0.1:1 to 1.3:1. It is necessary to use the customary suspension stabilizers, either inorganic dispersants such as tricalcium phosphate or magnesium pyrophosphate plus soaps, or organic protective colloids such as cellulose derivatives or partially saponified polyvinyl esters. For the impregnation, volatile blowing agents such as propane, butane, pentane, cyclopentane, cyclohexane or carbon dioxide are added to the suspension, preferably in amounts of from 2 to 10% by weight, based on the polymer. The impregnation temperatures are, depending on the amount of diphenylethene in the copolymer, higher than in the case of polystyrene, corresponding approximately to the glass transition temperature of the copolymer, if customary impregnation times of from about 2 to 10 hours are used. Post-impregnation is preferably carried out at from 100 to 180° C. at a pressure of from 5 to 20 bar.

The post-impregnation conditions are advantageously selected in such a way that the post-impregnated beads assume a spherical shape, ie. transformation of beads takes place.

After post-impregnation is complete, the suspension is cooled and the granules containing blowing agent are separated off, washed and dried. The granules are then coated on the surface. These coatings have different functions, for example prevention of electrostatic chargeability, shortening of the demolding time when producing moldings, etc.

Preferred coating agents are: alkaline earth metal stearates, finely divided silicas, N,N'-distearylethylenediamine, glyceryl monostearate, distearate and tristearate, tristearyl citrate, fatty acid esters of sorbitan, $C_{12}$–$C_{20}$-alkylsulfonates, fatty acid diethanolamides and choline ester chlorides.

The copolymer particles containing blowing agent can be stored in closed containers.

Prefoaming is carried out by heating the granules in suitable apparatuses by means of energy input. Energy input can be by means of hot air, steam, superheated steam, IR, UV, microwave or high frequency. Particularly useful is prefoaming in pressure prefoamers using steam. After prefoaming, the foamed beads are subjected to intermediate storage for pressure equilibration. Intermediate storage is carried out at room temperature and atmospheric pressure for 2–24 hours or even longer.

In another embodiment for production of the foam beads, minigranules are likewise impregnated in aqueous suspension, as described above, with a volatile blowing agent, but the suspension is not cooled but depressurized directly from the impregnation reactor by means of a suitable outlet device. The particles containing blowing agent thus foam directly to form foam beads.

To produce moldings, the prefoamed beads are post-foamed and welded together in a suitable mold by means of renewed energy input. Energy input is preferably carried out by means of steam under an appropriate pressure in a mold which does not close in a gastight manner. If desired, the foam beads prior to welding together are loaded with a certain prepressure by storage under pressure or predensified in the mold by means of compression. After substantial cooling, the finished moldings can be taken from the mold. After subsequent drying, they are ready-to-use.

To produce foam boards or sheets, the copolymer is plasticized in an extruder at from 180° to 280° C. and intimately mixed with a volatile blowing agent. Suitable blowing agents are chlorofluorocarbons or fluorocarbons such as 1,1,1-difluorochloroethane, difluorochloromethane and 1,1-difluoroethane, also ethanol, dimethyl ether, acetone, isopentane, pentane and carbon dioxide as well as mixtures thereof. The above described auxiliaries can also be added here. The melt is then extruded and metered through a wide-slot nozzle.

Parts and percentages in the examples are by weight.

Compared with conventional polystyrene foams, the foam materials of the present invention have an increased heat distortion resistance and improved solvent resistance. The foams are used accordingly, for example for insulation for hot water or components in instrument or automobile construction, shock-absorbing packaging, etc.

EXAMPLES

1. Minigranulation a) A styrene-1,1-diphenylethene copolymer having a $T_g$ of 120° C. and a 1,1-diphenylethene content of 14.2% was mini-granulated using an extruder ZSK 25 (Werner and Pfleiderer) with addition of 0.2% of Irganox 1076 (Ciba-Geigy) and 0.1% of finely divided PE wax (AF 31 Wax, BASF). The cylindrical particles had an average weight of 1.2 mg. Granules 1A.

b) The procedure of a) was repeated using a styrene-1,1-diphenylethene copolymer having a $T_g$ of 135° C. and a 1,1-diphenylethene content of 26.2%. The cylindrical particles had an average weight of 1.5 mg. Granules 1B.

c) The procedure of a) was repeated, but 2% of HBCD (hexa-bromocyclododecane) and 0.1% of dibutyltin dilaurate were additionally incorporated into the minigranules. The cylindrical particles had an average weight of 1.3 mg. Granules 1C.

2. Post-impregnation of the granules 1A–1C a) Granules 1A

A pressure-resistant 20 l stirred reactor was charged with:

18.5 kg of deionized water 0.078 kg of $Na_4P_2O_7$ 0.16 kg of $MgSO_4 \cdot 7 H_2O$ 0.012 kg of sodium n-$C_{15}$-alkylsulfonate (emulsifier K 30)

After stirring for 30 minutes, 1 kg of granules 1A was added to the reactor. The reactor was subsequently closed and the following temperature-program was run:

in 4 hours from RT to 117  C.

8 hours at 117.5° C.

in 4 hours from 117.5° C. to RT

From 100° C., 0.35 kg of pentane (industrial mixture) was added slowly over a period of 3 hours.

After the impregnation was complete, the particles were spherical and not conglutinated. They were treated with dilute nitric acid and subsequently washed with plenty of water. After drying (laid out for 16 hours at room temperature), the particles had a pentane content of 7.7%. Expandable granules 2A.

b) Granules 1B

The procedure of 2a) was repeated except that granules 1B were used and the plateau temperature in the impregnation cycle was increased to 132.5° C. Metering in of pentane commenced at 115° C. The particles obtained were spherical and not conglutinated; the pentane content after drying was 7.3%. Expandable granules 2B.

c) Granules 1C

The procedure of 2a) was repeated except that granules 1C were used and the 0.35 kg of pentane further comprised 0.005 kg of dicumol peroxide. The particles obtained were spherical and not conglutinated; the pentane content after drying was 7.8%. Expandable granules 2C.

3. Shelf life of the blowing agent-containing particles

The blowing agent-containing granules 2A were laid out in a thin layer at room temperature. The blowing agent contents were determined after various times. The values shown in Table 1 were measured.

TABLE 1

Blowing agent contents of the granules 2A as a function of the storage time

| Storage time [h] | Pentane content [%] |
| --- | --- |
| 0 | 7.7 |
| 16 | 7.65 |
| 48 | 7.0 |
| 72 | 6.8 |
| 96 | 6.75 |
| 120 | 6.6 |

The expandable particles therefore have a shelf life of at least a few months in the closed container.

4. Prefoaming of the blowing agent-containing granules

The blowing agent-containing granules 2A, 2B and 2C were each coated with 0.2% of a 1:1 mixture of a finely divided precipitated silica (FK 320, Degussa) and glyceryl monostearate. Coating was carried out by treatment in a paddle mixer (Lödige) for 10 minutes. The blowing agent-containing particles pretreated in this way were prefoamed in a pressure prefoamer. Table 2 shows the foaming conditions and the results obtained in the foaming tests. Prefoamed granules 3A, 3B, 3C.

TABLE 2

Conditions and results for the prefoaming of the granules 2A, 2B and 2C

| | Foaming conditions | | | Results | | |
| --- | --- | --- | --- | --- | --- | --- |
| Granules | Pressure [bar] | Temperature [°C.] | Time [sec] | Density [g/l] | Blowing agent content [%] | Remarks |
| 2A | 0.4 | 110 | 30 | 35.0 | 3.05 | not conglutinated |
| 2B | 1.4 | 125 | 20 | 35.2 | 2.90 | not conglutinated |
| 2C | 0.4 | 110 | 30 | 34.8 | 2.95 | not conglutinated |

5. Final foaming

The prefoamed granules 3A, 3B and 3C as described in Example 4) were subjected to intermediate storage for 20 hours for the purpose of gas exchange and then foamed in a pressure-resistant mold having dimensions of 10×5×2.5 cm by treatment with steam. The conditions employed here are shown in Table 3.

TABLE 3

Conditions in the final foaming of the granules 3A, 3B and 3C

| | Final foaming conditions | | |
| --- | --- | --- | --- |
| Granules | Pressure [bar] | Temperature [°C.] | Time [sec] |
| 3A | 1.1 | 122 | 30 |
| 3B | 2.3 | 135 | 30 |
| 3C | 1.1 | 122 | 30 |

In all three cases, moldings having good welding together and virtually flat surfaces were obtained. Moldings 4A, 4B and 4C.

6. Experiments for determining the flame resistance of the moldings 4A, 4B and 4C Three moldings from each of the series 4A, 4B and 4C were clamped in a holder and ignited by means of a 3 cm high, blue flame of a Bunsen burner. All three moldings of the series 3A and 3B burned away completely. In all three cases of the series 3C, the moldings extinguished immediately as soon as the flame of the Bunsen burner was removed.

We claim:

1. A foam material based on styrene polymers, wherein the styrene polymer consisting essentially of a copolymer of styrene with from 2 to 50 mol % of 1-diphenylethene and up to 20 mol % of α-methylstyrene, ring alkylated styrene, acrylonitrile or maleic anhydride in copolymerized form.

2. A foam material as claimed in claim 1 which is in the form of beads having a diameter of from 0.2 to 10 mm and a bulk density of from 8 to 100 $g \cdot l^{-1}$.

3. A foam material as claimed in claim 1 which is in the form of a molding having a density of from 8 to 100 $g \cdot l^{-1}$ and comprising foam beads as claimed in claim 2 welded to one another.

4. A foam material as claimed in claim 1 which is in the form of boards having a thickness of from 15 to 200 mm and a density of from 8 to 100 $g \cdot l^{-1}$.

5. A foam material as claimed in claim 1 which is in the form of sheets having a thickness of from 1 to 12 mm and a density of from 8 to 100 $g \cdot l^{-1}$.

6. A foam material as claimed in claim 1, further comprising from 0.5 to 10 percent by weight of a flame retardant.

7. A foam material as claimed in claim 6, further comprising from 0.1 to 1.0 percent by weight of a flame retardant synergist.

8. A foam material as claimed in claim 1, wherein the styrene polymer consists of a copolymer of styrene and 1,1-diphenylethene.

* * * * *